Sept. 29, 1931.  W. A. SMITH ET AL  1,825,165
FLEXIBLE MATERIAL GRIP
Filed Jan. 27, 1930   2 Sheets-Sheet 1

Inventors
W. A. Smith
H. A. Belden

By Clarence A. O'Brien
Attorney

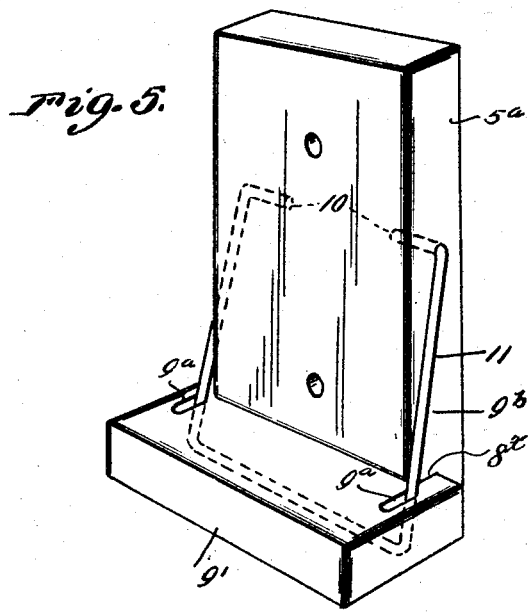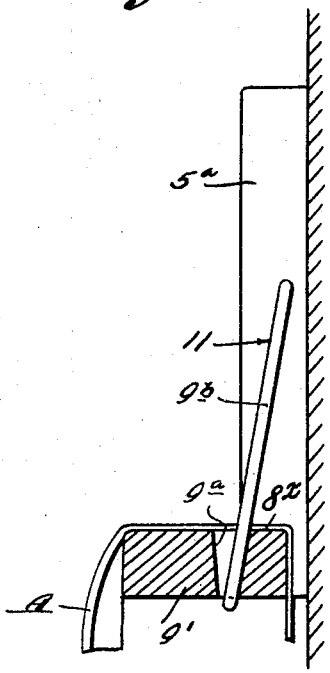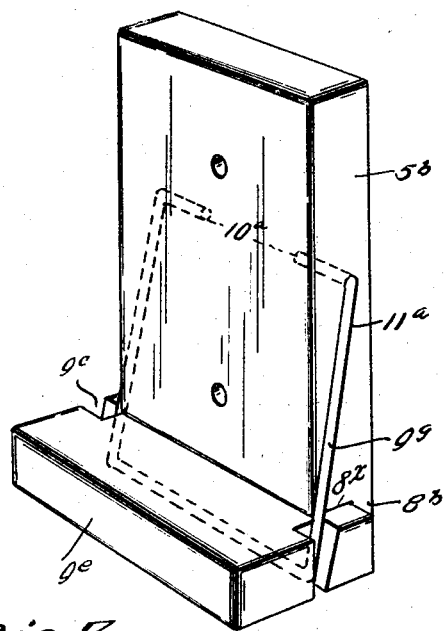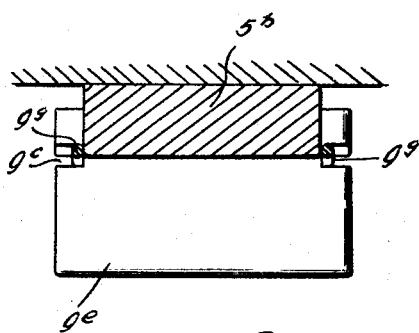

Patented Sept. 29, 1931

1,825,165

UNITED STATES PATENT OFFICE

WILLIAM ANDREW SMITH AND HUGH A. BELDEN, OF SHERMAN, TEXAS

FLEXIBLE MATERIAL GRIP

Application filed January 27, 1930. Serial No. 423,867.

This invention relates to new and useful improvements in clamps, and more particularly to a novel clamp for supporting flexible material.

The principal object of the invention is to provide a clamp especially adapted for supporting wash rags, towels, and various other articles of flexible material.

In the following specification, other important objects and advantages of the invention will readily become apparent to the reader.

In the drawings:—

Fig. 5 represents a perspective view of a modification of the invention.

Fig. 6 represents a side elevational view of the form shown in Fig. 5 with the lower section in cross section, showing the device engaged with a piece of flexible material.

Fig. 7 represents a perspective view of another form of the invention.

Fig. 8 represents a horizontal sectional view through the form of the invention shown in Fig. 7 and looking downwardly toward the lower section.

Figure 1:
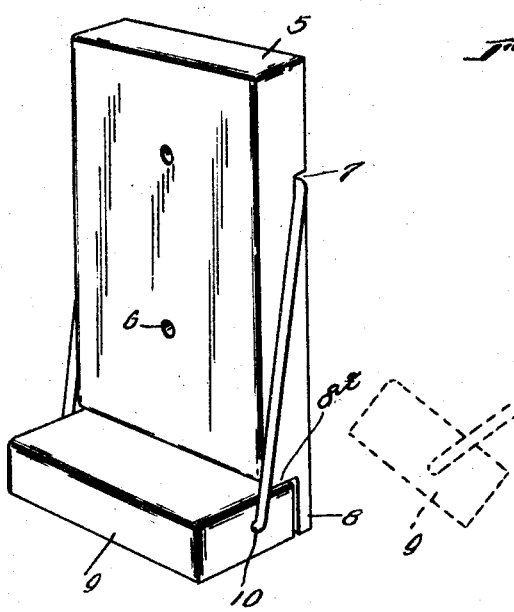
Figure 1 represents a perspective view of one form of the invention.

Referring to the drawings, wherein like numerals designate like parts, it can be seen that the form of the invention shown in Fig. 1 includes a rectangular-shaped block 5 having openings therein through which securing means may be disposed for securing block 5 to a wall or other suitable stationary structure. The back side of this block 5 has a transversely extending channel 7 therein adjacent the upper end thereof, while the lower end of the block has the forward side thereof removed to provide the upstanding relatively thin flange 8 against which the smaller rectangular-shaped block 9 is adapted to engage at one longitudinal edge thereof, the adjacent longitudinal edge of the block 9 being engaged against the shoulder 8x defined by the provision of the flange 8.

Figure 2:
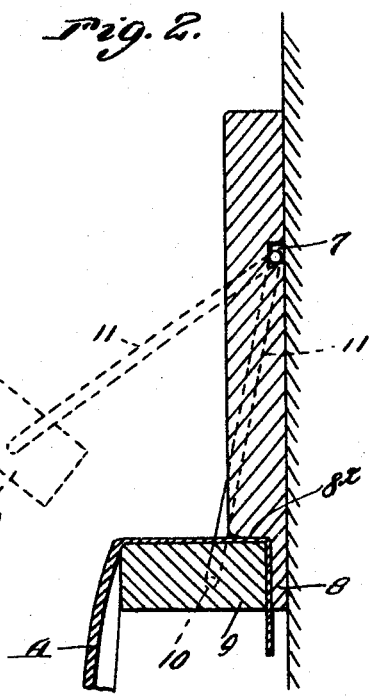
Fig. 2 represents a vertical sectional view through the form of the invention shown in Fig. 1 in the act of clamping a piece of material.
Figure 3:
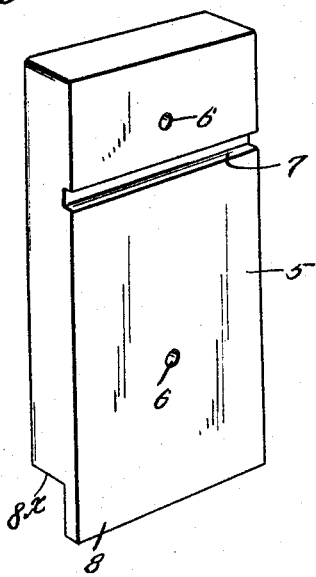
Fig. 3 represents a perspective view disclosing the back side of the back section of the form of the invention shown in Fig. 1.
Figure 4:
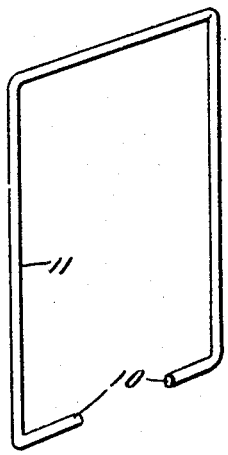
Fig. 4 represents a perspective view of the bail employed in Fig. 1.

The ends of the blocks 9 are provided with openings to receive the inwardly turned ends 10 of the U-shaped bail 11, the bight portion of which is to engage in the transversely extending channel 7 of the back of the block 5 in the manner substantially shown in Figs. 1 and 2.

Obviously, when a piece of flexible material A is engaged over the block 9 and between the flange 8 and the adjacent block 9, a downward pressure on the lower end of the material A will result in the clamping action of the block 9 against the material.

Obviously to disengage the material, block 9 may be swung to the dotted line position shown in Fig. 2.

Fig. 5 shows a somewhat modified form of the invention, in that the blocks 9' has downwardly tapering openings 9a in the ends thereof to receive the leg portion 9b of the U-shaped bail generally referred to by numeral 11.

This bail is provided with inwardly turned ends 10 for engagement in openings in the longitudinal edges of the block 5a, while the bight portion of the bail engages against the bottom side of the block 9' substantially as shown in Fig. 6.

Obviously, the same clamping action will result when a piece of material is engaged over the block 9' and pressure is effected by a downward direction on the depending portion of the material.

Fig. 7 shows a third form of the invention wherein the block 5b is provided with a flange 8 on the lower end thereof against which one longitudinal edge portion of the block 9b abuts. This block 9b has its ends notched out as at 9c, the notch being of downwardly tapering formation. The notches receive the leg portions 9g of the bail, generally referred to by numeral 11a, the bail being of U-shape and having its inwardly disposed ends 10a abutting into the longitudinal edge portions of the block 5b, while the bight portion of the bail 11a is disposed against the bottom side of the block 9.

Obviously the flexible material can be clamped between the block 9 and the flange 8b in substantially the same manner as it is clamped between the corresponding members of the form shown in Figs. 1 and 5.

With the flexible material between the block 9e and the flange 8b, any downward pressure on the material will cause the block to slightly rock resulting in the upper inner edge portion of the block engaging the material against the lower end of the block 9b, while the inner lower edge engages the material against the flange 18, thus gripping the material against any possible displacement.

From the foregoing specification, it will be seen that the same sets forth the invention in definite terms, and it is to be understood that numerous changes in the shape, size, and materials may be resorted to without departing from the spirit and scope of the invention as claimed hereinafter.

Having thus described our invention, what we claim as new is:—

1. A flexible material clamp comprising a stationary block, a movable block, a shoulder on the stationary block, a link between the stationary block and the movable block, said movable block being rectangular in shape and adapted to urge the material to be clamped against the shoulder by one edge of the block and against the stationary block by another edge of the movable block, the ends of the movable block being provided with notches through which the leg portions of the link extend, the free ends of the link member being swingably connected to the stationary block.

2. A flexible material clamp comprising a body, a U-shaped link having its end portions engaged into the body permitting the link member to swing, and a block rockably mounted on the bight portion of the link member so that one edge portion thereof can clamp a piece of material against one end of the body.

WILLIAM ANDREW SMITH.
HUGH A. BELDEN.